United States Patent Office 3,530,206
Patented Sept. 22, 1970

3,530,206
O,O-DILOWERALKYL-O - (2-CHLORO - 4 - BROMO PHENYL) PHOSPHATES AND THIOPHOSPHATES
Ernst Beriger, Allschwil, Switzerland, assignor to Ciba Limited, Basel, Switzerland, a Swiss company
No Drawing. Filed Mar. 17, 1967, Ser. No. 623,842
Claims priority, application Switzerland, Mar. 25, 1966, 4,370/66
Int. Cl. C07f 9/12, 9/18
U.S. Cl. 260—964   4 Claims

ABSTRACT OF THE DISCLOSURE

A compound of the formula

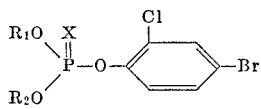

in which $R_1$ and $R_2$ each represents a lower alkyl radical and X represents a member selected from the group consisting of oxygen and sulfur. Said compounds are useful in combating harmful insects, bacteria, fungi, microorganisms and other pests.

---

The present invention provides phosphoric acid esters of formula

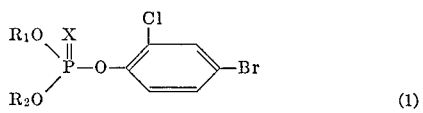

in which $R_1$ and $R_2$ represent identical or different lower alkyl radicals and X represents an oxygen or sulphur atom, which esters possess valuable pesticidal properties, and are especially useful for combating harmful insects, acarides, nematodes, snails, micro-organisms, particularly phytopathogenic bacteria and fungi as well as undesired plants.

The present invention also provides pesticidal preparations, which comprise, as active ingredient, a compound of the above mentioned formula together with a carrier.

The preparations may contain one or more of the following: A solid carrier, a diluent, a dispersing agent, a wetting agent, an adhesive or fertilizer, as well as known pesticides.

The preparations of the invention are especially effective against plant pests of the most diverse nature, for example against bud roller, fruit maggots, grape roller and thrips.

Examples of substances of Formula I are especially the corresponding thiophosphoric acid (X=S) dimethyl and diethyl esters ($R_1$, $R_2$=—$CH_3$ and —$C_2H_5$ respectively).

In order to manufacture directly sprayable solutions of the compounds of general Formula I, it is, for example, possible to use mineral oil fractions having a high medium boiling range, for example diesel oil or kerosene, coal tar oil and oils of vegetable or animal origin, as well as hydrocarbons for example, alkylated naphthalenes and tetrahydronaphthalene, optionally with the use of xylene mixtures, cyclohexanols, ketones, and furthermore chlorinated hydrocarbons for example trichlorethane and tetrachlorethane, trichlorethylene or trichlorobenzenes and tetrachlorobenzenes. It is advantageous to use those organic solvents that have a boiling point above 100° C.

It is especially advantageous to prepare aqueous applications forms from emulsions, concentrates, pastes or wettable spraying powders by adding water. As emulsifiers or dispersing agents, there may be mentioned nonionic products, for example condensation products of aliphatic alcohols, amines or carboxylic acids having a long chain hydrocarbon residue of about 10 to 20 carbon atoms and ethylene oxides, for example the condensation products of octadecyl alcohol and 25 to 30 mols of ethylene oxide, or that of soya fatty acid and 30 mols of ethylene oxide or that of technical oleylamine and 15 mols of ethylene oxide or that of dodecylmercaptan and 12 mols of ethylene oxide. Amongst the anionic emulsifiers which may be used there may be mentioned the sodium salt of dodecyl alcohol sulphuric acid ester, the sodium salt of dodecyl benzenesulphonic acid, the potassium or triethanolamine salt of oleic acid or of abietic acid or of mixtures of these acids, or the sodium salt of a petroleum sulphonic acid. It is also possible to use cationic dispersing agents, for example quaternary ammonium compounds such as cetyl pyridinium bromide or dihydroxyethyl benzyl dodecyl ammonium chloride.

In order to manufacture powdering and dusting materials there may be used as solid carriers: talc, kaolin, bentonite, calcium carbonate, calcium phosphate, but also charcoal, cork powder, wood flour and other materials of vegetable origin.

It is also advantageous to manufacture the preparations in a granular form. The various preparations may also contain substances that are usually added to pesticidal preparations and which improve the distribution, adhesion, resistance to rain or penetrating power. As such substances, fatty acids, resins, glue, casein or alginates may be mentioned.

The preparations of the invention may be employed by themselves or together with usual pesticides, especially insecticides, acaricides, nematocides, bactericides or further fungicides or herbicides.

When using preparations which contain a compound of Formula I as a deleafing agent, for example for cotton, tomatoes, beans and the like, solutions are mainly used. Possible solvents are paraffin fractions of boiling point 120 to 160° C. There may also be added to such preparations further known deleafing substances, for example, trialkylthio-phosphites or alkylpolysulphides.

Furthermore, there may be used as solvents, alcohols, for example ethanol, isopropanol, butanol, chlorinated hydrocarbons, ketones for example acetone, methylethyl ketone, methylisobutyl ketone, dimethylformamide or cyclohexanone. Solutions obtained in this way may be used as such by themselves, or many be dispersed in an aqueous system and sprayed on the plants in this way.

If the preparations for combating nematodes used contain one or more of the phosphoric acid esters defined by Formula I as active substances, then numerous application possibilities exist.

Since the active substances of Formula I are generally viscous oily liquids, which are practically insoluble in water, but are soluble in acetone and alcohols, they may be added to the soil of fields in the form of aqeous preparations.

Many of the phosphorus compounds of the invention are effective even when used in an amount of within the range of from 0.005–50 parts by weight per 1 million parts of soil. A field application of about 3 to 28 kg./ha. is appropriate.

As a rule, the preparations should be distributed at a depth of 7.5 to 15 cm., but in some cases it is distributed at a depth of 60 cm. or more.

The active compounds may also be distributed in the growth medium by allowing them to seep into the medium in an unmodified form. In general, however, the nematocides are introduced into the soil in the form of a liquid or a dusting agent, which contains the active substances. When used in this way, the phosphoric acid compounds may be mixed with one or more additives or materials for the treatment of soil or for combating pests, including water or other liquid carriers, surface-active dispersing agents and finely divided inert solid substances. Depending on the concentration of the active substance, such mixtures may be distributed directly in the soil or may be used as concentrates and subsequently diluted with further inert carriers, in order to obtain the finished preparations. The amount of phosphoric acid compound required for the growth medium can comfortably be distributed in an amount of 40 1. to 1000 cubic metres or more of liquid carrier, or in about 20 to 2000 kg. of solid carrier per hectare.

The exact concentration of the phosphorus compounds in the various forms of preparation for the treatment of growth media can vary, as long as the medium contains the requisite quantity of active substance. The concentration of active substance in the liquid preparations which serve to prepare the desired quantity is generally within the range of from 0.000001 to 50 percent by weight, if desired up to 90 percent by weight. In dusting agents concentration of active substance may be within the range of from 0.08 to 20% by weight. In compositions which are to be used as concentrates, the active substance may be present in a concentration of 5 to 95 percent by weight.

Liquid materials which contain the desired quantity of phosphorus compounds may be manufactured by dispersing the active substance in water by adding a suitable surface-active dispersing agent, for example an ionic or non-ionic emulsifier. Such materials may contain one or more solvents which are not miscible with water. The selection of the dispersing agent and emulsifier and the amount to be used is determined by the nature of the mixture and by the ability of the additive to assist the dispersing of the phosphoric acid compounds in the aqueous carrier. Dispersing agents and emulsifiers which may be used in the mixtures are preferably condensation products of alkylene oxides with phenols and organic acids, alkyl arylsulphonates, polyoxyethylene derivatives of sorbitane esters, complex ether alcohols and mahogany soaps.

In order to manufacture dusting agents, the active phosphoric acid compounds are distributed in and on a finely divided inert solid carrier, for example talc, chalk or gypsum.

When making these preparations, the carrier is mechanically ground with the compound or impregnated with a solution thereof in a volatile organic solvent. Equally, dusting agents containing the compounds may be manufactured from various solid surface-active dispersing agents, for example from bentonite, fuller's earth, attapulgite and other types of clay. Depending on the proportions of the constituents, these dusting agents may be used as concentrates and subsequently diluted with further solid surface-active dispersing agents or with talc, chalk or gypsum. Such concentrated dusting agents may also be dispersed in water in the presence or absence of a dispersing agent, in order to obtain aqueous soil impregnating agents.

The soil may be treated with the phosphoric acid compounds or with a form of preparation containing the active substances in the usual manner, for example by simple mixing with the soil, by applying to the surface of the soil and subsequent harrowing-in or rolling in to the desired depth or by using water, in order to ensure penetration. The soil is preferably impregnated with the nematocidal materials, with the aid of water serving to irrigate the soil.

The phosphorus compounds of Formula I used as active substances may be manufactured by reacting phosphorus oxychloride or thiophosphoryl chloride successively either with 2-chloro-4-bromophenol or a metal phenolate thereof, and with an alcohol or the alcohol $R_1OH$ and/or $R_2OH$ or metal alcoholates thereof.

The process described can be carried out in the following variants: (Ar=2-chloro-4-bromophenyl residue).

(A) Reaction of phosphorus oxychloride or of thiophosphoryl chloride with an alkali metal phenolate ArOMe and further reaction of the resulting phosphoric acid or thiophosphoric acid phenol ester dichloride with a metal alcoholate of an alcohol corresponding to $R_1$ or $R_2$.

(B) If it is intended to manufacture esters in which the radicals $R_1$ and $R_2$ are different, the phosphoric acid or thiophosphoric acid phenol ester dichloride obtained according to (A) is reacted with an alcohol corresponding to $R_1$ or $R_2$ in an inert solvent, for example chlorobenzene. When using this procedure, it is advantageous to work at the boiling point of this solvent, and air is passed through the reaction mixture in order to remove the hydrochloric acid which is eliminated during the reaction. The corresponding monochlorides, which may also be used as active substances, are obtained in this way. The resulting monochlorides may subsequently be converted to the desired mixed esters, by means of metal alcoholates.

(C) Conversely, the esters of Formula I may also be obtained by preparing phosphoric acid or thiophosphoric acid 0.0-dialkyl ester monochlorides, in a known manner, and further reacting these with alkali metal phenolates (ArOMe).

(D) It is also possible to manufacture the phosphorus compounds in question by converting phosphites of formula

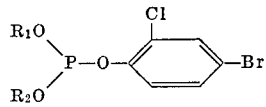

into the corresponding thiophosphoric acid esters or phosphoric acid esters by means of sulphurising or oxidising agents.

As sulphurising agents which may be used, there may be mentioned sulphur itself or alkali polysulphides. Pure oxygen, air or hydrogen peroxide may be used as oxidising agents.

The process described may also be modified by treating dithiophosphoric acid dialkyl esters which may be manufactured from $P_2S_5$ and alcohols with chlorine, and further reacting the corresponding chlorides with 2-chloro-4-bromophenol

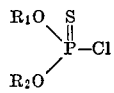

In this way, $P_2O_5$ can also be converted to the corresponding diesters with alcohols and these treated with chlorine, whereby the corresponding chlorides

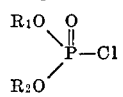

are obtained, or trialkyl phosphites may be converted with chlorine into the corresponding diesters

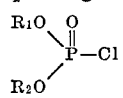

($R_1=R_2$).

The phosphoric acid esters and thiophosphoric acid esters defined by Formula I are new.

The present invention therefore also provides compounds of formula

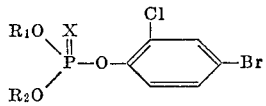

in which $R_1$ and $R_2$ represents identical lower alkyl residues and X represents an oxygen or sulphur atom.

The following examples illustrate the invention.

EXAMPLE 1

41.3 parts of 4-bromo-2-chlorophenol (melting point 50°), 32 g. of potash and 1 g. of copper powder are stirred in 150 parts by volume of methyl ethyl ketone. 32.1 parts of dimethylthiochlorophosphate are added drop by drop to this mixture, during 15 minutes and heated for a further 8 hours to 70–75°. After cooling, the salts are filtered off and the filtrate is evaporated in vacuo. The residue is dissolved in methylene chloride and twice washed each time with 50 parts by volume of 5% strength sodium hydroxide solution. After evaporation of the solvent, 44 parts of a pale yellow oil of the following constitution are obtained.

(1) 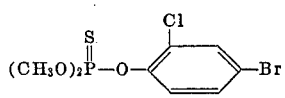

Analysis for $C_8H_9BrClO_3PS$: P found 9.3%; P calculated 9.3%.

The following compounds are obtained in an analogous manner:

(2) 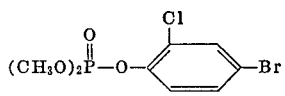

(from 4-bromo-2-chlorophenol and dimethylchlorophosphate)

(3) 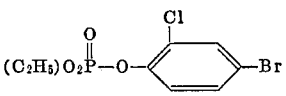

(from 4-bromo-2-chlorophenol and diethylchlorophosphate).

EXAMPLE 2

40 g. of the active substance obtained in accordance with Example 1 are dissolved in a little xylene together with a mixture of anionic and non-ionic xylene-soluble emulsifier, and the combined material is made up to 100 ccs. with xylene. A 40% strength emulsion concentrate is thus obtained, which can be diluted with water, as desired.

EXAMPLE 3

(1) Formulation

An emulsifiable concentrate is used containing 40% active substance, manufactured in accordance with Example 2. The concentration data given below relate to the formulated product.

(2) Experiments to combat red and grey bud rollers. *Spilosoma ocellana* and *Argyroploce variegana*

Apple standards of various types were sprayed on 14th April (shortly before flowering) and counted on 3rd May. There were three trees per plot.

| Preparation | Number of caterpillars per 100 flower rosettes | Percent effect |
|---|---|---|
| Untreated | 5.5 | |
| 0.1% of the emulsion concentrate of Example 2 | 0.2 | 97 |
| 0.1% of the emulsion concentrate (DDVP) | 0.2 | 97 |

(3) Experiments to combat fruit maggot, *Carpocapsa pomonella*

(A) Bush trees of the Golden Permaine (G) and Freiherr von Berlepsch (B) type were treated. Of the entire area of 128 trees, half were left untreated. The count comprised all fruit (fallen fruit and picked fruit). Spraying dates: 2nd July/22nd July/18th August.

| Preparation | Type | Total fruit | Percent of total attacked | Percent effect |
|---|---|---|---|---|
| Untreated | G | 19,274 | 7.8 | |
| | B | 10,167 | 12.4 | |
| 0.075% of the emulsion concentrate of Example 2 | G | 2,043 | 0.5 | 93.8 |
| | B | 461 | 1.1 | 91.2 |

(B) 3 at a time of younger standards of the Golden Permaine variety were treated. Spraying dates: 30th June/13th July/30th July/16th August/30th August.

| Preparation | Total fruit | Percent of total attacked | Percent effect |
|---|---|---|---|
| Untreated | 1,883 | 28.3 | |
| 0.075% of the emulsion concentrate | 2,631 | 6.7 | 76.5 |

(4) Experiments to combat grape roller, *Polychrosis botrana*

(A) *Experiments to combat the first generation.*—Merlot variety, repeated 3 times, sprayed on 10th June, 100 inflorescences per plot counted on 23rd June.

| Preparation | Number of larvae per 100 inflorescences | Percent effect |
|---|---|---|
| Untreated | 14 | |
| 0.1% of the emulsion concentrate of Example 2 | 0 | 100 |

(B) *Experiments to combat the second generation.*—Legend as for A, sprayed on 29th July, counted on 14th August.

| Preparation | Number of larvae per 100 grapes | Percent effect |
|---|---|---|
| Untreated | 34 | |
| 0.1% of the emulsion concentrate of Example 2 | 2.3 | 93 |

(5) Experiments to combat thrips (A) *Experiments with Summer Phlox.*—Species: Thrips tabaci. In order to test the effect, 5 shoots of 15–20 cm. length, per plot, were twice washed with water containing a wetting agent, and the water subsequently filtered and the insects counted on the filter. Spraying took place on 12th August.

| Preparation | Number of thrips before spraying | Live after 7 days | Live after 12 days |
|---|---|---|---|
| Untreated | 142 | 171 | 32 |
| 0.1% of the emulsion concentrate of Example 2 | 275 | 0 | 1 |

(B) *Experiments with Summer Asters*:

| Preparation | Number of thrips before spraying | Live after 4 days | Live after 8 days |
|---|---|---|---|
| Untreated | 61 | 51 | 62 |
| 0.1% of the emulsion concentrate of Example 2 | 18 | 1 | 4 |

The compounds of Example 1 have a very good nematocidal effect, for example against *Panegrellus redivivus*.

I claim:
1. A compound of the formula

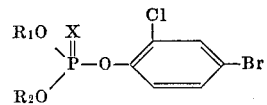

in which $R_1$ and $R_2$ each represents a lower alkyl radical and X represents a member selected from the group consisting of oxygen and sulfur.
2. The compound of the formula
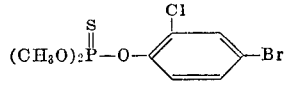
3. The compound of the formula
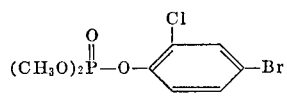
4. The compound of the formula
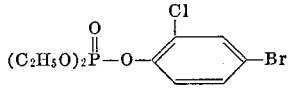
References Cited
FOREIGN PATENTS
898,755   6/1962   Great Britain.
CHARLES B. PARKER, Primary Examiner
A. H. SUTTO, Assistant Examiner
U.S. Cl. X.R.
71—71, 72; 260—973, 974; 424—224